United States Patent [19]

Abercrombie, Jr.

[11] 4,144,084
[45] Mar. 13, 1979

[54] METHOD FOR CONTROLLING THE VISCOSITY OF DISPERSED CLAY SLURRIES

[75] Inventor: William F. Abercrombie, Jr., Macon, Ga.

[73] Assignee: J. M. Huber Corporation, Locust, N.J.

[21] Appl. No.: 852,632

[22] Filed: Nov. 18, 1977

Related U.S. Application Data

[63] Continuation-in-part of Ser. No. 479,976, Jun. 17, 1974, abandoned.

[51] Int. Cl.² ............................................. C09C 1/42
[52] U.S. Cl. .............................. 106/288 B; 106/72; 106/308 Q; 106/309
[58] Field of Search ............... 106/288 B, 308 Q, 72

[56] References Cited

U.S. PATENT DOCUMENTS 3,510,331  5/1970  Talvenheimo et al. ................ 106/72

Primary Examiner—Winston A. Douglas
Assistant Examiner—J. V. Howard
Attorney, Agent, or Firm—Ernest A. Schaal; Harold H. Flanders

[57] ABSTRACT

A method for controlling the viscosity of dispersed clay slurries is disclosed. In accordance with the invention the problem associated with shipping or storing clay slurries in tank cars or tanks, that is, significant increases in the viscosity of the slurry which often results in the formation of a gelled mass, is overcome by the addition of tartaric acid. The addition of the tartaric acid serves to control the viscosity of the clay slurry in a manner such that it remains at a substantially uniform and low level even when the slurry is shipped or stored over extended periods of time. The tartaric acid is added to the slurry in relatively small quantities, i.e., up to 5.0 pounds/ton clay and unexpectedly does not affect the properties or characteristics of the clay pigment or product.

3 Claims, 1 Drawing Figure

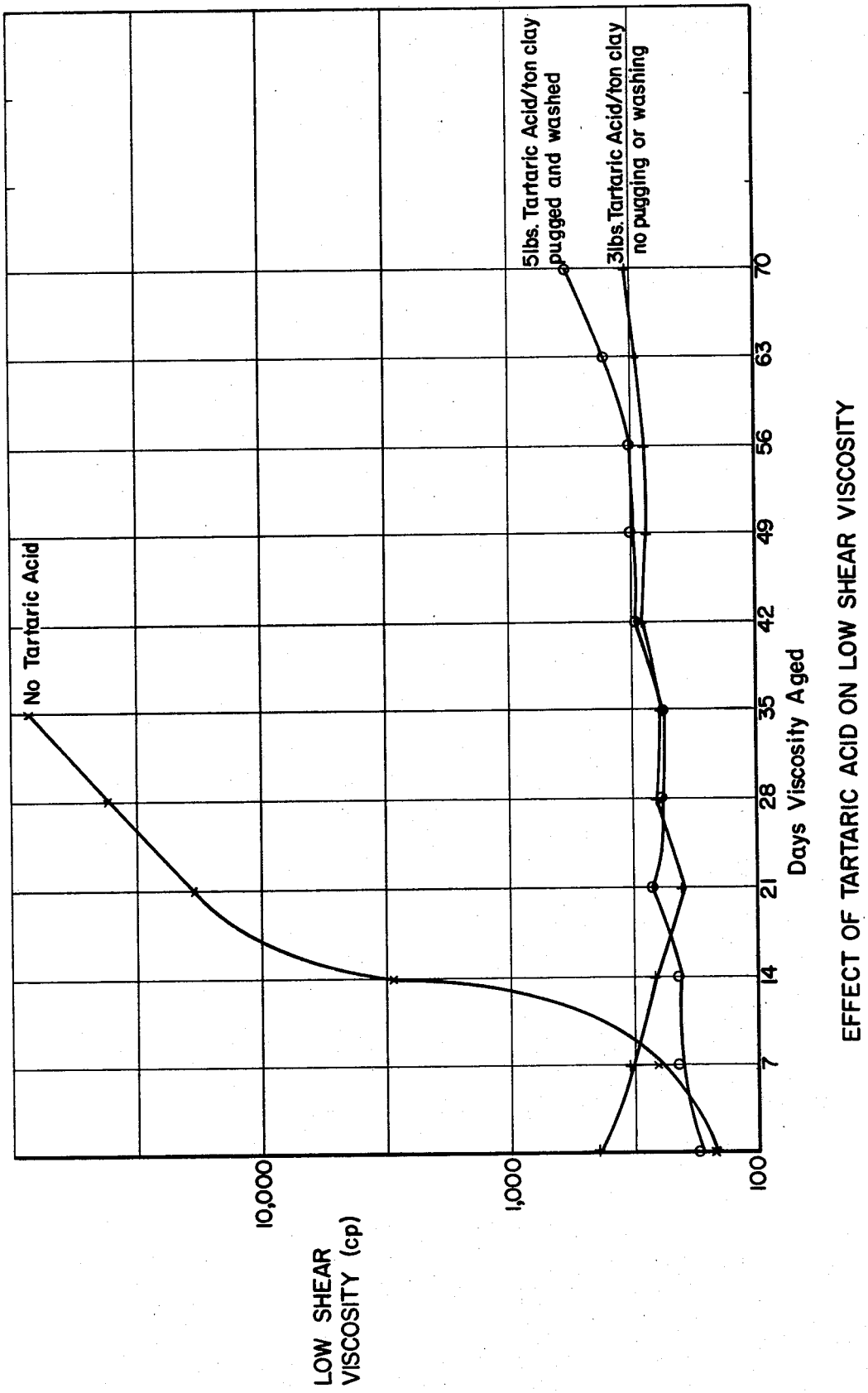

METHOD FOR CONTROLLING THE VISCOSITY OF DISPERSED CLAY SLURRIES

CROSS REFERENCE TO RELATED CASE

This case is a continuation-in-part application of U.S. Ser. No. 479,976 entitled Method for Controlling the Viscosity of Dispersed Clay Slurries filed June 17, 1974 by William F. Abercrombie, Jr., now abandoned.

BACKGROUND OF THE INVENTION

1. Field of the Invention

The present invention relates to clays and, more particularly, to a unique technique for maintaining low viscosity and preventing gelling of clay slurries stored or shipped for extended periods of time.

2. Description of the Prior Art

Refined clays are sold under certain required specifications such as brightness, particle-size distribution, viscosity, and the like. Because natural variations in the properties of crude clay are common, the crude clay ore is subjected to various known processing techniques, such as fractionation, delamination, treatment with chemical additives, leaching agents, flocculants, etc. A specific example of such a process is disclosed in U.S. Pat. No. 3,371,988. As disclosed in this patent, an aqueous clay suspension is contacted with a peptizing agent in an amount in excess of that required to maintain minimum viscosity and in an amount sufficient to remove titanium impurities and to improve the brightness of the clay. Further examples of known processes for refining or treating clays are disclosed in U.S. Pat. Nos. 3,320,027 and 3,442,677.

It is common practice in the industry to ship refined clay pigments to the customer as a dispersed high solids slurry. When shipping the clay slurry, the viscosity of the slurry increases, often in such a manner that after several days a thick mass or gel is formed. Obviously the gelled mass cannot be easily removed from the tank car. Thus, the customer may have to employ extensive mechanical means to redisperse the slurry or use various chemicals in order that the clay can be moved from the tank car. Often, the tank car is returned to the manufacturer as being unacceptable. This increase in viscosity and the formation of a gel has been found to occur even though a peptizing or dispersing aid has been added to the clay slurry prior to its shipment or storage. This dispersing agent would be in addition to that employed in the aforementioned U.S. Pat. No. 3,371,988, wherein the peptizing agent is employed in the refining of the clay itself.

Prior art proposals for stabilizing the viscosity of clay slurries or slips are disclosed in U.S. Pat. No. 3,341,340 and Canadian Pat. No. 854,271. These patents teach the use of high molecular weight polymeric materials or alkali metal salts of aminotrimethyl phosphonic acid to stabilize clay slurries.

SUMMARY OF THE INVENTION

It is a general object of the present invention to provide a novel method for maintaining the low shear viscosity of clay slurries at uniform and low levels when shipped or stored over extended periods of time and to prevent gelling of the slurry.

A further object is to provide a method for maintaining the low shear viscosity of an aqueous slurry of finely divided kaolin clay particulates at uniform and low levels.

Yet a further object is to provide a method for maintaining the viscosity of aqueous slurries of refined kaolin clay pigments at uniform and low levels in a manner such that the properties of the refined clay are not affected.

Still another object is to provide a method for forming an aqueous kaolin clay slurry which has a high clay-solids content and a uniform low shear viscosity to the extent that said viscosity does not significantly increase even when the slurry is stored or shipped for extended periods of time.

Other objects and a fuller understanding of the invention may be had by referring to the following description and claims taken in conjunction with the accompanying drawing.

In its broadest aspects, the present invention is based on the discovery that the low shear viscosity of clay slurries can be maintained at low levels for extended periods of time by adding a small amount of tartaric acid or any alkali metal or alkaline earth metal salt of acid, preferably sodium tartrate.

An aqueous slurry is formed of finely divided particulate clay pigments, preferably kaolin clay, more preferably refined kaolin clay having a G.E. brightness of at least 85 and a particle size distribution such that at least 80% of the particles, by weight, have an equivalent spherical diameter less than 2 microns. The slurry may have a clay solids content of from about 50% to 75% by weight, preferably from about 60% to 72%.

Only a small amount of acid or salt need be added to the clay slurry, on the order of 0.5 to 5.0 lbs., preferably 0.5 to 3.0 lbs. of acid or salt per ton of clay.

The acid or salt remains in the clay slurry for the entire time that the slurry is stored or shipped. This period of time is usually greater than 7 days, and may be as great as 63 days without any substantial increase in low shear viscosity.

A dispersed slip of clay can be formed by: (1) forming the aqueous slurry of finely divided particular clay pigments; (2) adding from 0.5 to 5.0 lbs of the acid or salt per ton of clay; and (3) adding a deflocculating agent to the slurry.

As described above, the acid in the slip is tartaric acid. The salt is any alkali metal or alkaline earth metal salt of tartaric acid, preferably sodium tartrate.

As also described above, the clay in the slip is preferably kaolin clay, most preferably refined kaolin clay having a G.E. brightness of at least 85 and a particle size distribution such that at least 80% of the particles, by weight, have an equivalent spherical diameter less than 2 microns. The slurry preferably should have a clay solids content of from about 60 to 72%.

BRIEF DESCRIPTION OF THE DRAWING

In order to facilitate the understanding of this invention, reference will now be made to the appended drawing. The drawing should not be construed as limiting the invention but is exemplary only. In the drawing:

FIG. 1 is a graph showing the effect of tartaric acid on the stability of low shear viscosity.

DESCRIPTION OF PREFERRED EMBODIMENTS

As briefly noted hereinabove, the present invention relates to a unique method for maintaining the low shear viscosity of clay slurries (such as kaolin clay slurries) at uniform and low levels. It embodies the concept and discovery that the addition of tartaric acid or its alkali metal or alkaline earth metals salts serves to control the viscosity of the clay slurry in a manner such that it remains at a substantially uniform and low level even when the slurry is shipped or stored over extended periods of time (i.e., more than 7 days).

In refining clays, the crude ore from the mines is generally crushed or blunged and then slurried with water in order to produce a clay slip or slurry. These slurries are then classified to the desired clay fraction by such well-known methods as gravity sedimentation, hydroseparation, and centrifugal forces. Prior to this classification, the clay slurries are usually treated with a peptizing or dispersing agent in order to achieve a dispersion of the clay particles to facilitate fractionation. Thereafter, the clay slurries are subjected to further refining or processing steps, e.g., leaching, etc., to obtain a clay having a specific brightness, etc. The clay is then recovered by filtration, washed and dispersed for shipment.

The method of the invention is especially applicable to the treatment of clay slurries containing from about 60% to about 72% clay solids (weight basis) although lesser benefits may also be realized with clay slurries as dilute as about 50% solids or as concentrated as about 75% solids. In general, economics dictate that the slurry must have a relatively high clay solids content (i.e., 60 to 72% clay solids by weight). It is in this range the significant increases in viscosity occur, and gels are formed. With kaolin clays, a 72% clay solids slip is about the maximum obtainable even when the most effective clay dispersing agents are used. Thus, the specific clay used may limit the maximum concentration of the slurry.

Superior results are obtained when treating slurries comprising an aqueous dispersion of finely divided refined kaolin clay. This is a naturally occurring clay mineral consisting predominately of the clay mineral kaolinite, a crystalline hydrated aluminum silicate of the formula $Al_2O_3 \cdot 2SiO_2 \cdot 2H_2O$. The invention is especially useful with commercial paper coating grades of kaolin clay which have been chemically bleached and which have been refined to the extent that grit and undispersible agglomerates have been eliminated. Specific examples of the latter are those manufactured and sold under the trademarks "Hydragloss," "Hydrafine," and "Hydrasperse" by the J. M. Huber Corporation. These materials have a G.E. brightness of at least 85 and a particle size distribution such that at least 80% of the particles, by weight, have an equivalent spherical diameter less than 2 microns.

The treatment of high solids content slurries comprising an aqueous mixture of the aforesaid refined, paper-grade, kaolin clays is not merely a preferred embodiment of the invention. In fact, the problem of maintaining the low shear viscosity at uniform and low levels and preventing gelling is particularly acute when shipping or storing high solids content refined kaolin clay slurries. The fact that superior results are obtained when treating the latter in accordance with the invention is thus remarkable.

Turning to further specific details of the invention, tartaric acid or salt may be added to the slurry in an amount up to about 5.0 lbs./ton of clay, based on the dry weight of said clay. The use of less than 0.5 lbs. is generally not as effective, whereas an amount greater than 5.0 lbs/ton clay does not serve to more effectively control the viscosity and also may adversely affect the properties of the clay pigment. The acid or salt may be added to the slurry as a dry powder or as a solution thereof.

The salt can be any alkali metal or alkaline earth metal salt of tartaric acid, preferably sodium tartrate. The use of tartaric acid and salts result in maintaining the clay slurry low shear viscosity at a substantially uniform and low level for extended periods of time, longer than 7 days.

Prior to the present invention, an attempt was made to prevent gelling by adding a peptizing agent to the slurry in an amount sufficient to obtain minimum viscosity. In addition, prior to forming the slurry for shipment, the filter cake was frequently reslurried, filtered and/or washed a second time. The disadvantages of double filtration and/or washing, are obvious since this requires considerable time and expense, resulting in an increase of the overall cost of the product. A remarkable aspect of the present invention lies in the fact that the double filtration and washing steps, and their inherent disadvantages, may be eliminated.

The following examples will serve to further illustrate the present invention, but it should be expressly understood that they are not intended to limit it thereto.

EXAMPLE I

In this example, a high solids content (70%) slurry of Hydragloss ®, an East Georgia coating clay having a particle size of 92–95% by weight of particles finer than 2 microns, was prepared from a dispersed filter cake and a spray dried clay. The specific viscosity control agent was added in the desired amount and the Brookfield viscosity determined. The slurries were aged at 130° F and a Brookfield viscosity redetermined at varying periods of time. The results of these tests are shown in Table I.

TABLE I

| | | | Brookfield Viscosity, cps. at 70% Solids-Aged at 130° F | | |
|---|---|---|---|---|---|
| Clay | Additive | Additive, lbs./ton | Initial | 7 Days Aging | 14 Days Aging |
| Single-Filtered Hydragloss | None | — | 214 | 905 | 4400 |
| | Tartaric Acid | 0.5 | 214 | 350 | 400 |
| | Tartaric Acid | 1.0 | 231 | 417 | 380 |
| | Tartaric Acid | 2.0 | 249 | 344 | 350 |
| | Tartaric Acid | 3.0 | 292 | 420 | 400 |

EXAMPLE II

The general procedure of Example I was repeated except that the amount of acid added to the slurry was varied in amounts up to 5.0 pounds per ton clay. It was found that particularly advantageous results were obtained when the acid was added in amounts in the range from 0.5 to 3.0 pounds per ton clay. In further tests, the slurries of Example I were aged up to a period of 35 days. In summary, the viscosity increased with the extended aging. However, the acid served to effectively control the viscosity of the slurry even when aged to this extent, i.e, 35 days. These tests further established the critical nature of the range of from 0.5 to 3.0 pounds per ton clay. Thus, after 35 days, the low shear viscosity of the slurry with the addition of 2.0 to 3.0 pounds per ton tartaric acid was less than 500 cps; whereas in the control this increased to the extent that a gelled mass was formed. Amounts up to 5.0 pounds acid prevented gelling for aging periods up to 35 days.

EXAMPLE III

The procedure of Examples I and II were repeated except that the following kaolin clays were substituted for the Hydragloss: Hydrafine ®, a paper coating clay having a particle size of 92% by weight of particles finer than two microns and a trace coarser than five microns; hydrasperse ®, a paper coating fraction having a particle size of 80–82% by weight finer than two microns and three to six percent by weight coarser than five microns, and CWF, a filler fraction having a particle size of 30–40 percent by weight finer than two microns and 26–44% coarser than five microns. Hydrafine, Hydrasperse, and CWF clays are Georgia kaolin clays mined and processed by the J. M. Huber Corporation at Huber, Georgia. The results of these tests were substantially the same as those of Examples I and II and clearly established that the addition of the tartaric acid served to control the viscosity of the slurry and prevented gelling even when the slurry was aged for periods up to 35 days.

From the above, it will be seen that the present invention provides a truly unique and simplified process for controlling the viscosity of high solids clay slurries even when the latter are shipped or stored over extended periods of time. In the unique method embodiments set forth above, it is disclosed that the acid is added to the high solids slurry prior to its shipment or storage. This addition should be before the high solids slurry has reached minimum dispersion or viscosity by the addition of the dispersing or peptizing agent. If the acid is added after minimum dispersion, the initial viscosity of the slurry increases. Thereafter, the viscosity, upon aging, is controlled in the manner as taught herein. The initial viscosity increase, however, is objectionable and should be avoided. It should further be noted that the acid can be added to the low solids slurry or dispersion in which the clay itself is processed or refined, i.e., during leaching, flocculation, etc. This is indeed remarkable. In tests or experiments in which the acid was added at various stages of the processing of the clay, it was found that the viscosity of high solids slurries (formed after filtering, etc., as set forth above) was effectively controlled for extended periods of time, e.g., up to 35 days.

In U.S. Pat. No. 3,510,331, the above acid is used to reduce the high shear viscosity of clays prior to further processing. In this process, acid is added to a clay until it forms a mass of puggable consistency; the mass is pugged; then the mass is washed to remove the acid.

Unlike U.S. Pat. No. 3,510,331, the present invention involves maintaining the low shear viscosity at a substantially uniform and low level when stored or shipped for extended periods of time. The acid stays in the slurry during the entire time that the clay slurry is stored or shipped. Unlike 3,510,331, this process involves neither a pugging step nor a washing step to remove the acid from the slurry. Also, U.S. Pat. No. 3,510,331 fails to recognize the use of salts of these acids in maintaining low viscosities.

EXAMPLE IV

To show how the present invention compares with U.S. Pat. No. 3,510,331 in maintaining low levels of low shear viscosity, a series of runs were made using both the procedures outlined in Example I of this disclosure (with no pugging or washing of the slurry), and the same procedures but where the material was pugged and washed to remove the acid. The results are shown in Table II.

TABLE II

| Run | Control | I | II | III | IV |
|---|---|---|---|---|---|
| Additive | None | Tartaric Acid | Tartaric Acid | Sodium Tartrate | Tartaric Acid |
| Amount Added Per ton of clay | — | 3 | 5 | 5 | 5 |
| Remarks | * | * | * | * | ** |
| Aged Viscosity After: 0 Days | 150 | 450 | 1,140 | 215 | 172 |
| 7 | 250 | 330 | 680 | 215 | 185 |
| 14 | 3,000 | 265 | 500 | 215 | 188 |
| 21 | 18,600 | 198 | 473 | 215 | 270 |
| 28 | 42,000 | 255 | 630 | 218 | 245 |
| 35 | 85,000 | 240 | 545 | 220 | 235 |
| 42 | — | 305 | 620 | 245 | 285 |
| 49 | — | 273 | 730 | 245 | 313 |
| 56 | — | 280 | 650 | 270 | 330 |
| 63 | — | 305 | 620 | 345 | 410 |
| 70 | — | 320 | 660 | 375 | 580 |
| 77 | — | 420 | 700 | 440 | 840 |

*No pugging or washing.
**Clay pugged as acid added, then washed

U.S. Pat. No. 3,510 discloses that after the clay has been washed, it can be made down in a slip employing usual deflocculating agents. In the present invention, it was discovered that the clay can be made down in a slip employing a deflocculating agent, without washing the acid from the clay.

While the present invention has been described with reference to specific embodiments, this application is intended to cover those various changes and substitutions which may be made by those skilled in the art without departing from the spirit and scope of the appended claims.

I claim:

1. A method of maintaining the low shear viscosity of a kaolin clay slurry at a substantially uniform and low level while the slurry is being shipped or stored, said method comprising the steps of:
    (a) forming an aqueous slurry of finely divided particulate kaolin clay pigments having a clay solids content of from 60 to 70% by weight;
    (b) adding to the slurry from 0.5 to 3.0 pounds of a compound per ton of said clay, based on the dry weight of said clay pigment; wherein said compound is selected from the group consisting of tartaric acid and sodium tartarate; and
    (c) maintaining said compound in said slurry for at least seven days to maintain the low shear viscosity of said slurry at a substantially uniform and low level, such that the low shear viscosity will be below 710 centipoises for the first 77 days of storage or shipment.

2. A method of maintaining the low shear viscosity of a kaolin clay slurry at a substantially uniform and low level while the slurry is being shipped or stored, said method consisting essentially of the steps of:
    (a) forming an aqueous slurry of finely divided refined particulate kaolin clay pigments having a clay solids content of from 60 to 72% by weight;
    (b) adding to the slurry from 0.5 to 3.0 pounds of a compound per ton of said clay, based on the dry weight of said clay pigment; wherein said compound is selected from the group consisting of tartaric acid and sodium tartarate;

(c) maintaining said compound in said slurry for at least seven days to maintain the low shear viscosity of said slurry at a substantially uniform and low level, such that the low shear viscosity will be below 710 centipoises for the first 77 days of storage and shipment; and (d) adding a deflocculating agent to said slurry of clay and compound to form a dispersed slip of clay.

3. A method according to claim 2 wherein said refined kaolin clay has:

(a) a G.E. brightness of at least 85; and
(b) a particle size distribution such that at least 80% of the particles, by weight, have an equivalent diameter of less than 2 microns.

* * * * *

UNITED STATES PATENT AND TRADEMARK OFFICE
CERTIFICATE OF CORRECTION

PATENT NO. : 4,144,084
DATED : March 13, 1979
INVENTOR(S) : William F. Abercrombie, Jr.

It is certified that error appears in the above-identified patent and that said Letters Patent are hereby corrected as shown below:

Column 6, line 27, "No. 3,510" should be -- No. 3,510,331 --.

Column 6, Claim 1, line 47, "60 to 70%" should be -- 60 to 72% --.

Signed and Sealed this

Twelfth Day of June 1979

[SEAL]

Attest:

RUTH C. MASON
Attesting Officer

DONALD W. BANNER
Commissioner of Patents and Trademarks